(12) United States Patent
Zhang et al.

(10) Patent No.: US 10,865,631 B1
(45) Date of Patent: Dec. 15, 2020

(54) HYDRAULIC FRACTURING SYSTEM FOR DRIVING A PLUNGER PUMP WITH A TURBINE ENGINE

(71) Applicant: YANTAI JEREH PETROLEUM EQUIPMENT & TECHNOLOGIES CO., LTD., Yantai (CN)

(72) Inventors: Rikui Zhang, Yantai (CN); Xiance Li, Yantai (CN); Xincheng Li, Yantai (CN); Yipeng Wu, Yantai (CN); Chunqiang Lan, Yantai (CN); Sheng Chang, Yantai (CN); Peng Zhang, Yantai (CN); Xiaolei Ji, Yantai (CN)

(73) Assignee: Yantai Jereh Petroleum Equipment & Technologies Co., Ltd., Yantai (CN)

( * ) Notice: Subject to any disclaimer, the term of this patent is extended or adjusted under 35 U.S.C. 154(b) by 0 days.

(21) Appl. No.: 16/832,856

(22) Filed: Mar. 27, 2020

(30) Foreign Application Priority Data

Sep. 20, 2019 (CN) .......................... 2019 1 0893337

(51) Int. Cl.
| | |
|---|---|
| *E21B 43/267* | (2006.01) |
| *F04B 17/03* | (2006.01) |
| *E21B 21/06* | (2006.01) |
| *H02K 7/18* | (2006.01) |
| *F04B 47/02* | (2006.01) |

(52) U.S. Cl.
CPC ............ *E21B 43/267* (2013.01); *F04B 17/03* (2013.01); *B01F 2215/0081* (2013.01); *E21B 21/062* (2013.01); *F04B 47/02* (2013.01); *F05D 2220/76* (2013.01); *H02K 7/1823* (2013.01)

(58) Field of Classification Search
CPC .... E21B 43/267; E21B 21/062; E21B 43/247; E21B 43/26; E21B 43/2605; E21B 43/2607; F04B 17/03; F04B 47/02; B01F 2215/0081; F05D 2220/76; H02K 7/1823
See application file for complete search history.

(56) References Cited

U.S. PATENT DOCUMENTS

| | | | |
|---|---|---|---|
| 2007/0277982 A1* | 12/2007 | Shampine | E21B 43/16 166/308.1 |
| 2017/0218727 A1* | 8/2017 | Oehring | F02B 63/04 |
| 2018/0266412 A1* | 9/2018 | Stokkev G | F04B 47/04 |

* cited by examiner

*Primary Examiner* — James G Sayre

(57) ABSTRACT

The present invention discloses a hydraulic fracturing system for driving a plunger pump with a turbine engine, including a fracturing equipment, a high-low pressure manifold, a blending equipment and a sand-mixing equipment; a turbine engine is used as the power source of the fracturing equipment, the turbine engine is fueled by natural gas or diesel and drives the plunger pump to solve the current problems of diesel drive and electric motor drive. The fuel supply of a turbine engine with a dual-fuel system is diverse and not limited, especially when natural gas is used as the fuel, it will save more cost. The supply of natural gas in the whole hydraulic fracturing system is diversified, better meeting the demands of more customers. The entire fracturing equipment is disposed in a straight line along the transmission direction of power, better lowering the overall center of gravity of the fracturing equipment, and increasing the stability and safety of the fracturing equipment both in operation and transportation.

9 Claims, 2 Drawing Sheets

HYDRAULIC FRACTURING SYSTEM FOR DRIVING A PLUNGER PUMP WITH A TURBINE ENGINE

TECHNICAL FIELD

The present invention relates to the technical field of fracturing in oil and gas fields, and specifically to a hydraulic fracturing system for driving a plunger pump with a turbine engine.

BACKGROUND

Hydraulic fracturing has been applied in increasing the production in oil or gas wells for decades. For this process, a plunger pump is used to pump fluid into the wellbore under high pressure, and then the fluid is squeezed into the formation, fracturing several hydraulic fractures. Water, other liquids as well as fracturing proppants are also injected into the fractures. After fracturing, the fracturing base fluid is returned to the ground, with the fracturing proppants remaining in the fracture to prevent fracture closure, through which a large amount of oil and gas enter the wellbore to be exploited.

In the working sites of fracturing in oil and gas fields all over the world, the power driving modes for the plunger pump mainly include the following two ways:

One driving mode is that a diesel engine is connected to a transmission through a transmission shaft to drive the fracturing plunger pump to work. In other words, a diesel engine is used as the power source, a transmission and a transmission shaft are used as the transmission devices, and a plunger pump is used as the actuating element.

This configuration mode has the following disadvantages:

(1) Large volume and heavy weight: When a diesel engine drives a transmission to drive a plunger pump through a transmission shaft, a large volume is occupied, a heavy weight is involved, the transportation is restricted, and the power density is low;

(2) Environmental problems: During operations on a well site, the fracturing equipment driven by the diesel engine would generate engine waste gas pollution and noise pollution. The noise exceeding 105 dBA will severely affect the normal life of nearby residents;

(3) Cost inefficiency: The fracturing equipment driven by the diesel engine requires relatively high initial purchase costs and incurs high fuel consumption costs for unit power during operation, and the engine and the transmission also require very high routine maintenance costs.

The other driving mode is that an electric motor is connected to a transmission shaft or a coupling to drive the plunger pump to work. In other words, an electric motor is used as the power source, a transmission shaft or a coupling is used as the transmission device, and a plunger pump is used as the actuating element, i.e, electric drive fracturing.

Although the electric drive fracturing has many advantages itself, it is difficult to supply power for the fracturing well sites in that the power capacity on the well sites is too small to drive the whole fracturing unit, or there are not any power networks at all on the well sites. Therefore, generators have to be used to generate electricity. The most economical generation fuel is natural gas, but the users need to rent or purchase gas generator sets. For a fracturing well site without power networks, the power of the gas generator sets needs up to at least 30 MW. Purchasing such high-power gas generator sets is a great investment for customers. More importantly, in actual work progress, the accidental shutdown of the gas generator sets would cause the breakdown of the whole electric drive fracturing unit, thus seriously affecting the working quality, even causing work accidents.

Therefore, there is an urgent need for a hydraulic fracturing system to meet the current demands.

SUMMARY

To overcome the deficiencies in the prior art, an objective of the present invention is to provide a hydraulic fracturing system for driving a plunger pump with a turbine engine, in which a turbine engine is used to drive the plunger pump to solve the current problems of diesel drive and electric motor drive. The fuel supply of a turbine engine with a dual-fuel system (the turbine engine is fueled by diesel or natural gas) is diverse and not limited, especially when natural gas is used as the fuel, it will save more cost.

The objective of the present invention is achieved by the following technical measures: A hydraulic fracturing system for driving a plunger pump with a turbine engine, including a fracturing equipment, a high-low pressure manifold, a blending equipment and a sand-mixing equipment; the blending equipment is used for blending fracturing base fluid in the hydraulic fracturing system, the sand-mixing equipment provides the fracturing base fluid and a fracturing proppant to the high-low pressure manifold; one end of the high-low pressure manifold is connected to the fracturing equipment through a connection pipeline, the other end of the high-low pressure manifold is connected to a wellhead; a turbine engine is used as the power source of the fracturing equipment, and the turbine engine is fueled by natural gas or diesel.

Further, the turbine engine is fueled by natural gas, the natural gas is delivered to the turbine engine by a CNG tanker through CNG pressure regulating equipment, or delivered to the turbine engine by a LNG tanker through LNG gasification conveying equipment, or accessed through the wellhead gas port and delivered to the turbine engine through wellhead gas treatment equipment, or accessed through the pipeline gas port and delivered to the turbine engine through pipeline gas treatment equipment, the natural gas fuel is supplied in one or more of the above ways.

Further, the hydraulic fracturing system for driving a plunger pump with a turbine engine includes instrumentation which is used for monitoring the entire hydraulic fracturing system.

Further, the fracturing equipment is vehicle-mounted or semi-trailer mounted or skid mounted.

Further, the plunger pump in the fracturing equipment is a three cylinder pump or a five cylinder pump, the power of which is 2250 hp or above.

Further, the plunger pump is a five cylinder pump, the power of which is 5000 hp or above.

Further, the fracturing equipment includes one or more sets of turbine fracturing equipment.

Further, the turbine fracturing equipment includes a turbine engine, an exhaust system and a plunger pump, one end of the turbine engine is connected to the exhaust system, the other end of the turbine engine is connected to the plunger pump, the plunger pump is a plunger pump equipped with a reduction gearbox, the turbine engine is directly connected to an input end of the reduction gearbox on the plunger pump.

Further, the plunger pump, the turbine engine and the exhaust system are disposed in a straight line along the transmission direction of power.

Further, the turbine fracturing equipment includes an exhaust system, a turbine engine, a reduction gearbox, a transmission mechanism and a plunger pump, the exhaust system is connected to an exhaust port of the turbine engine, an output end of the turbine engine is connected to the reduction gearbox, and the reduction gearbox is connected to the plunger pump through the transmission mechanism.

Further, the exhaust system, the turbine engine, the reduction gearbox, the transmission mechanism and the plunger pump are disposed in a straight line along the transmission direction of power.

Compared with the prior art, the present invention has the following beneficial effects: A turbine engine is used to drive the plunger pump to solve the current problems of diesel drive and electric motor drive. The fuel supply of a turbine engine with a dual-fuel system (the turbine engine is fueled by diesel or natural gas) is diverse and not limited, which can be chosen by customers according to the actual situation. Especially when natural gas is used as the fuel, it will save more cost. The supply of natural gas in the whole hydraulic fracturing system is diversified, better meeting the demands of more customers. The entire fracturing equipment is disposed in a straight line along the transmission direction of power, better lowering the overall center of gravity of the fracturing equipment, and increasing the stability and safety of the fracturing equipment both in operation and transportation.

The present invention will be described in detail below with reference to the accompanying drawings and specific implementations.

Wherein, 1. CNG tanker, 2. CNG pressure regulating equipment, 3. natural gas pipeline, 4. turbine fracturing equipment, 5. connection pipeline, 6. high-low pressure manifold, 7. wellhead, 8. wellhead gas port, 9. wellhead gas treatment equipment, 10. sanding vehicle, 11. sand storage tank, 12. sand conveying equipment, 13. liquid storage tank, 14. sand-mixing equipment, 15. blending equipment, 16. chemical additive equipment, 17. instrumentation, 18. plunger pump, 19. turbine engine, 20. exhaust duct, 21. exhaust silencer, 22. transmission mechanism, 23. reduction gearbox, 24. reduction gearbox equipped on the plunger pump.

DESCRIPTION OF THE EMBODIMENTS

Figure 1:
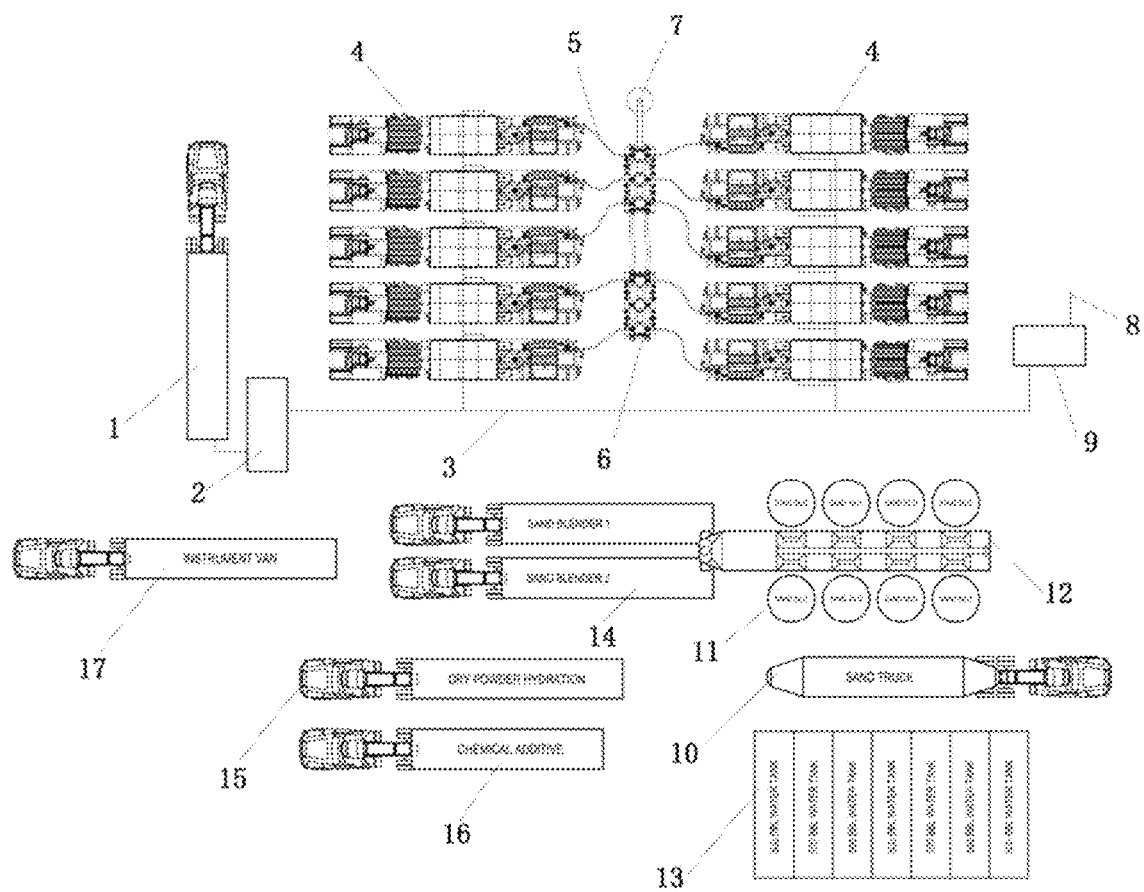
FIG. 1 is a schematic structural diagram of the hydraulic fracturing system of the invention.
Figure 2:
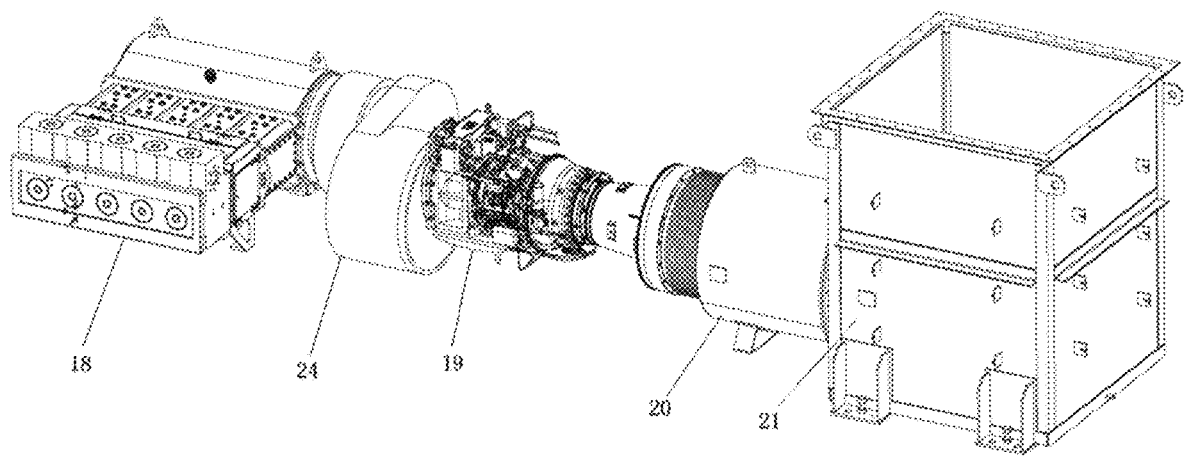
FIG. 2 is a schematic structural diagram of the turbine fracturing equipment of Embodiment 1.
Figure 3:
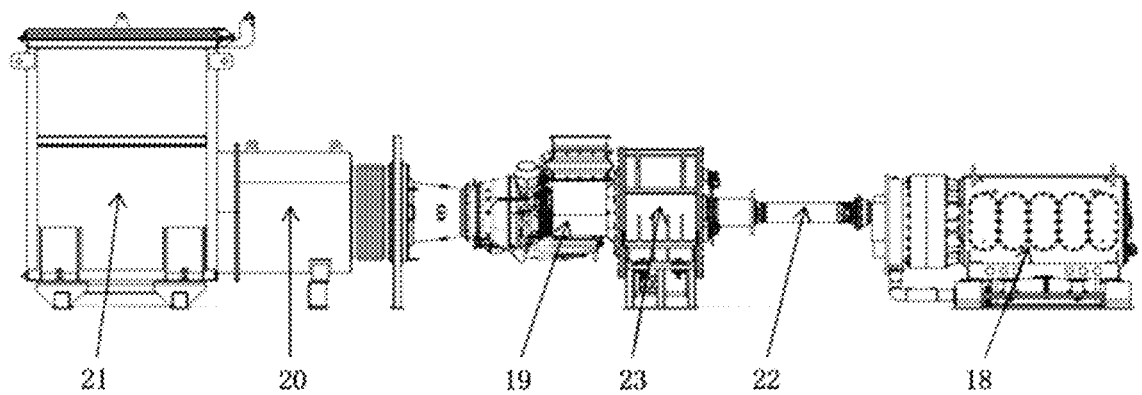
FIG. 3 is a schematic structural diagram of the turbine fracturing equipment of Embodiment 2.

As shown in FIGS. 1 to 3, a hydraulic fracturing system for driving a plunger pump with a turbine engine, including a connection pipeline 5, fracturing equipment, a high-low pressure manifold 6, a blending equipment 15 and a sand-mixing equipment 14; the blending equipment 15 is used for blending fracturing base fluid in the hydraulic fracturing system, the sand-mixing equipment 14 provides the fracturing base fluid and a fracturing proppant to the high-low pressure manifold 6; one end of the high-low pressure manifold 6 is connected to the fracturing equipment through the connection pipeline 5, the other end of the high-low pressure manifold 6 is connected to the wellhead 7; a turbine engine 19 is used as the power source of the fracturing equipment, the plunger pump 18 is driven by the turbine engine 19 with a high power-to-volume ratio and a small occupied area compared to the traditional fracturing equipment with a diesel engine as the power source, greatly reducing the number and occupied area of fracturing units in the entire fracturing equipment. The turbine engine 19 is fueled by natural gas or diesel. The turbine engine 19 with a dual-fuel system can be fueled by 100% fuel oil or 100% natural gas. The fuel supply is diverse so that customers can choose according to the actual situation. Especially when natural gas is used as the fuel, it will save more cost. In the working site of the hydraulic fracturing system, there are further provided with a sanding vehicle 10, a sand storage tank 11, sand conveying equipment 12, a liquid storage tank 13, and chemical additive equipment 16, wherein the liquid storage tank 13 provides water for the blending equipment 15, water and various additives are blended in the blending equipment 15 to form fracturing base fluid, which is then supplied to the sand-mixing equipment 14. A fracturing proppant is transported to the wellsite by the sanding vehicle 10 and conveyed into the sand storage tank 11. There may be multiple sanding vehicles 10. The fracturing proppant is conveyed to the sand-mixing equipment 14 from the sand storage tank 11 by sand conveying equipment 12. The fracturing base fluid and the fracturing proppant are mixed in the sand-mixing equipment 14 and then conveyed into the high-low pressure manifold 6, through which are distributed to each set of turbine fracturing equipment 4, and then the mixed fracturing liquid is injected into the wellhead 7 by a high pressure pump (injection path: turbine fracturing equipment 4—connection pipeline 5—high-low pressure manifold 6—wellhead 7), and then the formation of the oil well or gas well is fractured. The chemical additive equipment 16 is used to supply various chemical additives to the blending equipment 15 or the sand-mixing equipment 14.

In the operation site of the hydraulic fracturing system, a variety of relevant corollary equipment for natural gas supply can be arranged, such as CNG tanker 1, CNG pressure regulating equipment 2, wellhead gas port 8, wellhead gas treatment equipment 9 and the like. Of course, the CNG can be correspondingly replaced with LNG. For example, a combination of a LNG tanker and LNG gasification conveying equipment. Similarly, wellhead gas can also be replaced with pipeline gas, for example, a combination of a pipeline gas port and pipeline gas treatment equipment, and the like.

Specifically, when the turbine engine 19 is fueled by natural gas, the natural gas is regulated by the CNG pressure regulating equipment 2 on the CNG tanker 1, and then delivered to the turbine engine 19 through the natural gas pipeline 3; or gasified by the LNG gasification conveying equipment on the LNG tanker, and then delivered to the turbine engine 19 through the natural gas pipeline 3; or accessed through the wellhead gas port 8 and treated by the wellhead gas treatment equipment 9, and then delivered to the turbine engine 19 through the natural gas pipeline 3; or accessed through the pipeline gas port and treated by the pipeline gas treatment equipment, and then delivered to the turbine engine 19 through the natural gas pipeline 3, the natural gas fuel is supplied in one or more of the above ways. The supply of natural gas in the whole hydraulic fracturing system is diversified, better meeting the demands of more customers. There may be multiple CNG tankers 1 or/and LNG tankers.

The hydraulic fracturing system for driving a plunger pump with a turbine engine includes instrumentation 17 which is used for monitoring the entire hydraulic fracturing system.

The fracturing equipment is vehicle-mounted or semi-trailer mounted or skid mounted.

The plunger pump 18 in the fracturing equipment is a three cylinder pump or a five cylinder pump, the power of which is 2250 hp or above.

The plunger pump 18 is a five cylinder pump, the power of which is 5000 hp or above.

The fracturing equipment includes one or more sets of turbine fracturing equipment 4.

Turbine Fracturing Equipment Embodiment 1

The turbine fracturing equipment 4 is vehicle-mounted or semi-trailer mounted or skid mounted. The diagram and description shown in this embodiment is a schematic structural diagram of the up-loading components of the turbine fracturing equipment 4 after removing the vehicle or semi-trailer or skid.

The turbine fracturing equipment 4 includes a turbine engine 19, an exhaust system and a plunger pump 18, wherein one end of the turbine engine 19 is connected to the exhaust system, the other end of the turbine engine 19 is connected to the plunger pump 18. The plunger pump 18 is a plunger pump 18 integrated with a reduction gearbox, the turbine engine 19 is directly connected to an input end of the reduction gearbox 24 integrated on the plunger pump. An input speed of the reduction gearbox 24 integrated on the plunger pump matches an output speed of the turbine engine 19, and an input torque of the reduction gearbox 24 integrated on the plunger pump matches an output torque of the turbine engine 19, thus simplifying the transmission device between the plunger pump 18 and the turbine engine 19, that is, a transmission shaft or a coupling is omitted, greatly shortening the total length of the turbine fracturing equipment 4, with a simple structure and convenient for maintenance. The exhaust system includes an exhaust duct 20 and an exhaust silencer 21, one end of the exhaust duct 20 is connected to the exhaust silencer 21, the other end of the exhaust duct 20 is connected to an exhaust port of the turbine engine 19.

The plunger pump 18, the turbine engine 19 and the exhaust system are disposed in a straight line along the transmission direction of power, to avoid excessive transmission loss, thus ensuring the efficient transmission performance of the equipment, better lowering the overall center of gravity of the turbine fracturing equipment 4, and increasing the stability and safety of the turbine fracturing equipment 4 both in operation and transportation.

Turbine Fracturing Equipment Embodiment 2

The turbine fracturing equipment 4 is vehicle-mounted or semi-trailer mounted or skid mounted. The diagram and description shown in this embodiment is a schematic structural diagram of the up-loading components of the turbine fracturing equipment 4 after removing the vehicle or semi-trailer or skid.

The turbine fracturing equipment 4 includes an exhaust system, a turbine engine 19, a reduction gearbox 23, a transmission mechanism 22 and a plunger pump 18, wherein the exhaust system is connected to an exhaust port of the turbine engine 19, an output end of the turbine engine 19 is connected to the reduction gearbox 23, and the reduction gearbox 23 and the plunger pump 18 are connected through a transmission mechanism 22. The exhaust system includes an exhaust duct 20 and an exhaust silencer 21, one end of the exhaust duct 20 is connected to the exhaust silencer 21, the other end of the exhaust duct 20 is connected to the exhaust port of the turbine engine 19.

The exhaust system, the turbine engine 19, the reduction gearbox 23, the transmission mechanism 22 and plunger pump 18 are disposed in a straight line along the transmission direction of power, to avoid excessive transmission loss, thus ensuring the efficient transmission performance of the equipment, better lowering the overall center of gravity of the turbine fracturing equipment 4, and increasing the stability and safety of the turbine fracturing equipment 4 both in operation and transportation. The transmission mechanism 22 is a transmission shaft or a coupling.

The turbine engine 19 itself has the advantages of small volume and light weight, greatly decreasing the volume and weight of the turbine fracturing equipment 4.

It will be appreciated to persons skilled in the art that the present invention is not limited to the foregoing embodiments, which together with the context described in the specification are only used to illustrate the principle of the present invention. Various changes and improvements may be made to the present invention without departing from the spirit and scope of the present invention. All these changes and improvements shall fall within the protection scope of the present invention. The protection scope of the present invention is defined by the appended claims and equivalents thereof

What is claimed is:

1. A hydraulic fracturing system for driving a plunger pump with a turbine engine, comprising a fracturing equipment, a high-low pressure manifold, a blending equipment and a sand-mixing equipment; the blending equipment is used for blending fracturing base fluid in the hydraulic fracturing system, the sand-mixing equipment provides the fracturing base fluid and a fracturing proppant to the high-low pressure manifold; one end of the high-low pressure manifold is connected to the fracturing equipment through a connection pipeline, the other end of the high-low pressure manifold is connected to a wellhead; a turbine engine is used as the power source of the fracturing equipment, and the turbine engine is fueled by natural gas or diesel, wherein the fracturing equipment comprises one or more sets of turbine fracturing equipment, wherein the turbine fracturing equipment comprises a turbine engine, an exhaust system and a plunger pump, one end of the turbine engine is connected to the exhaust system, the other end of the turbine engine is connected to the plunger pump, the plunger pump is a plunger pump integrated with a reduction gearbox, the turbine engine is directly connected to an input end of the reduction gearbox integrated on the plunger pump, wherein an input speed of the reduction gearbox integrated on the plunger pump matches an output speed of the turbine engine, and an input torque of the reduction gearbox integrated on the plunger pump matches an output torque of the turbine engine.

2. The hydraulic fracturing system for driving a plunger pump with a turbine engine according to claim 1, wherein the turbine engine is fueled by natural gas, the natural gas is delivered to the turbine engine by a CNG tanker through CNG pressure regulating equipment, or delivered to the turbine engine by a LNG tanker through LNG gasification conveying equipment, or accessed through the wellhead gas port and delivered to the turbine engine through wellhead gas treatment equipment, or accessed through the pipeline gas port and delivered to the turbine engine through pipeline gas treatment equipment, the natural gas fuel is supplied in one or more of the above ways.

3. The hydraulic fracturing system for driving a plunger pump with a turbine engine according to claim 1, wherein the hydraulic fracturing system for driving a plunger pump with a turbine engine comprises instrumentation which is used for monitoring the entire hydraulic fracturing system.

4. The hydraulic fracturing system for driving a plunger pump with a turbine engine according to claim 1, wherein the fracturing equipment is vehicle-mounted or semi-trailer mounted or skid mounted.

5. The hydraulic fracturing system for driving a plunger pump with a turbine engine according to claim 1, wherein the plunger pump in the fracturing equipment is a three cylinder pump or a five cylinder pump, the power of which is at least 2250 hp.

6. The hydraulic fracturing system for driving a plunger pump with a turbine engine according to claim 5, wherein the plunger pump is a five cylinder pump, the power of which is at least 5000 hp.

7. The hydraulic fracturing system for driving a plunger pump with a turbine engine according to claim 1, wherein the plunger pump, the turbine engine and the exhaust system are disposed in a straight line along the transmission direction of power.

8. The hydraulic fracturing system for driving a plunger pump with a turbine engine according to claim 1, wherein the turbine fracturing equipment comprises an exhaust system, a turbine engine, a reduction gearbox, a transmission mechanism and a plunger pump, the exhaust system is connected to an exhaust port of the turbine engine, an output end of the turbine engine is connected to the reduction gearbox, and the reduction gearbox is connected to the plunger pump through the transmission mechanism.

9. The hydraulic fracturing system for driving a plunger pump with a turbine engine according to claim 8, wherein the exhaust system, the turbine engine, the reduction gearbox, the transmission mechanism and the plunger pump are disposed in a straight line along the transmission direction of power.

* * * * *